Sept. 4, 1951  W. T. DUNN  2,567,061
TRANSMISSION CONTROL
Filed Aug. 1, 1947  3 Sheets-Sheet 1
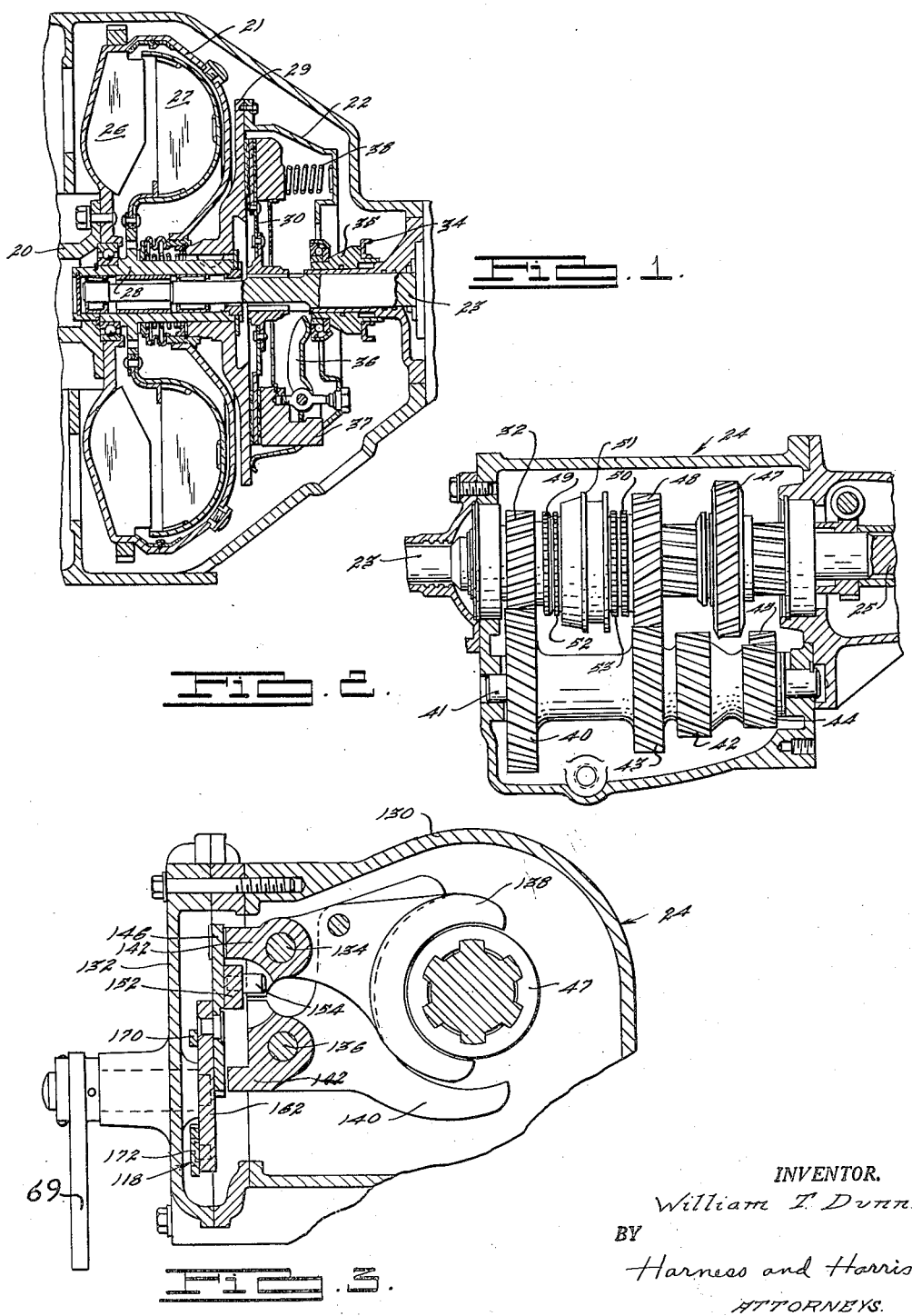
INVENTOR.
William T. Dunn
BY
Harness and Harris
ATTORNEYS.

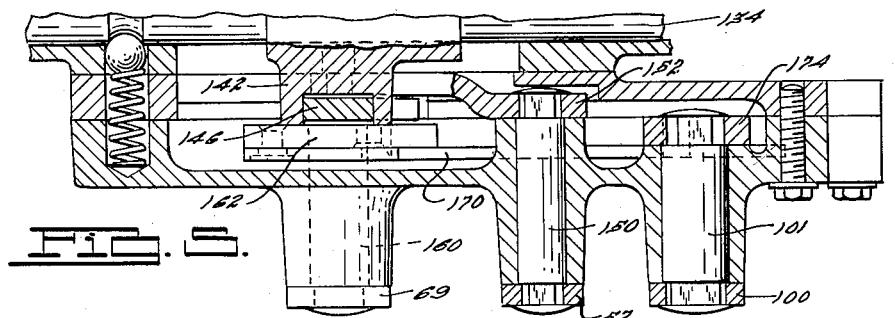
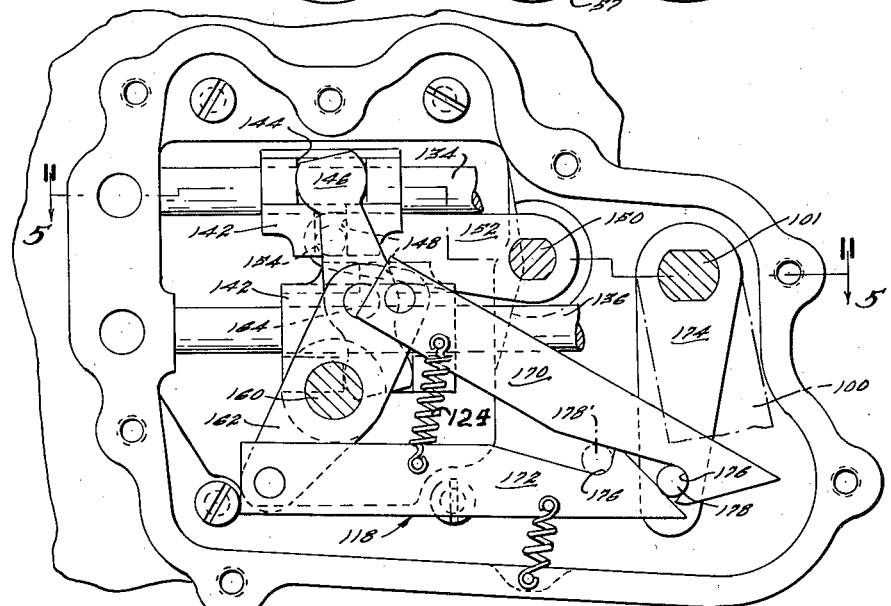
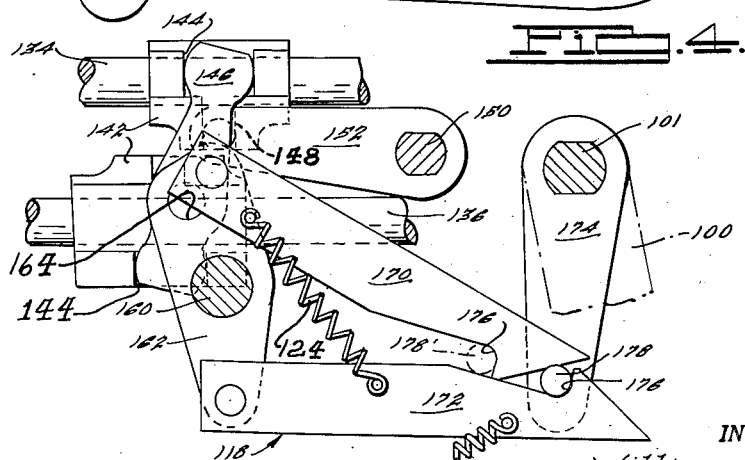

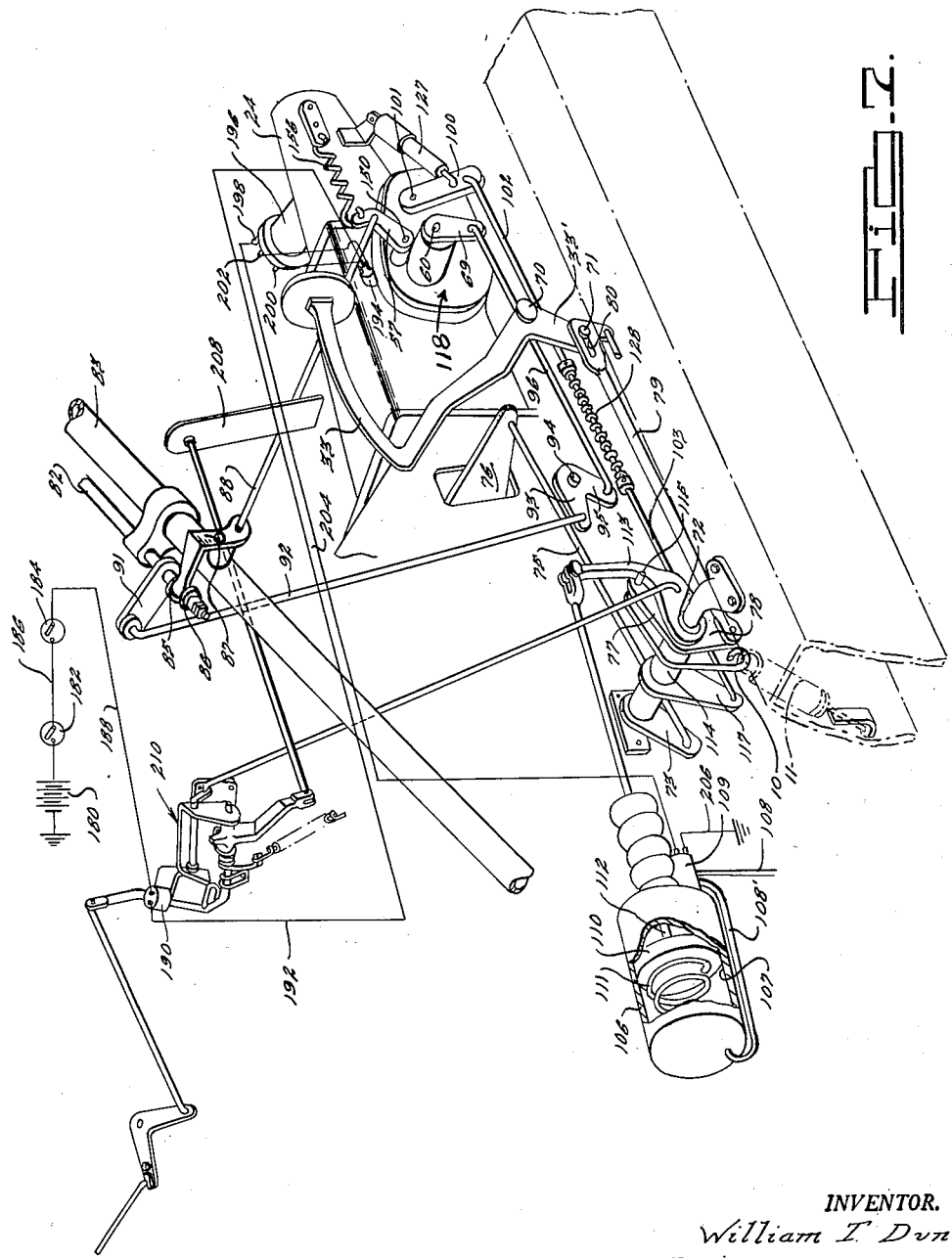

Patented Sept. 4, 1951

2,567,061

UNITED STATES PATENT OFFICE 2,567,061

TRANSMISSION CONTROL

William T. Dunn, Detroit, Mich., assignor to Chrysler Corporation, Highland Park, Mich., a corporation of Delaware Application August 1, 1947, Serial No. 765,393

4 Claims. (Cl. 74—335)

This invention relates to a transmission control apparatus adapted to convert successive cycles of reciprocatory motion into movement in a first direction and movement in a second direction and more particularly to the location and association of this apparatus relative to the transmission of a motor vehicle.

This invention constitutes an improvement over the apparatus described in application, Serial No. 755,612 filed on June 19, 1947 by Maurice C. Robinson. The motion translating mechanism described in the Robinson application has been relocated so that it is incorporated in the side of the transmission housing as a part of and operatively associated with shift control mechanism in the transmission.

It is a principal object of the invention to provide a simplified transmission construction in which motion translating mechanism is aligned with a side cover plate in a transmission and positioned within the transmission housing.

It is a further object of the invention to provide a simplified and economical construction for a transmission and automatic controls associated therewith.

The invention will be described herein in conjunction with a suggested transmission and clutch control apparatus as a typical application thereof although it is not intended that the invention be limited to the associated apparatus described therein.

In the drawings:

Fig. 1 is a longitudinal sectional elevation through the main clutch mechanism;

Fig. 2 is a vertical section of a transmission;

Fig. 3 is a sectional elevation of a portion of the transmission;

Fig. 4 is a side elevation of a portion of the transmission shown in Fig. 3, but with the cover plate removed from the transmission;

Fig. 5 is a section on the line 5—5 of Fig. 4;

Fig. 6 is a partial elevation of the apparatus shown in Fig. 4 with the apparatus located in a different position during its operation;

Fig. 7 is a digrammatic view of a transmission and clutch control apparatus of which my invention forms a component part.

In a motor vehicle, the usual internal combustion engine having a crankshaft 20 drives through fluid coupling 21 and a conventional type of friction main clutch 22 through shaft 23 to a variable speed ratio transmission 24 from which the drive passes from the output shaft 25 to the vehicle rear wheels in the usual manner.

The engine crankshaft 20 carries the vaned fluid coupling impeller 26 which in the well known manner drives the vaned runner 27 whence the drive passes through hub 28 to clutch driving member 29. This member then transmits the drive when clutch 22 is engaged as in Fig. 1, through driven member 30 to the transmission driving shaft 23 carrying the main drive pinion 32. A clutch pedal 33 controls clutch 22 such that when the driver depresses this pedal yoke 34 and collar 35 are thrust forward to cause levers 36 to release the clutch driving pressure plate 37 against springs 38 thereby releasing the drive between runner 27 and shaft 23. The primary function of the main clutch 22 is to enable shifts to be made manually or automatically in transmission 24. The relation of the fluid coupling to the control system is described in the copending application, Serial No. 661,298 filed April 11, 1946 by C. A. Neracher et al.

Referring to the transmission in Fig. 2 the main drive pinion 32 is in constant mesh with the gear 40 of the countershaft gear cluster mounted for rotation on the countershaft 41. This gear cluster according to well known practice, comprises a low speed gear 42, a second speed gear 43, and a reverse gear 44 which is in constant mesh with the reverse idler gear 45. The transmission driven shaft 25 extends rearwardly to drive the ground wheels of the vehicle. The terms second speed and direct drive will be referred to herein for simplicity but it is to be understood that the invention is not so limited. Any change between a relatively slow speed drive and a relatively fast speed drive may be obtained by the control apparatus when associated with a corresponding change speed mechanism.

The driven shaft 25 has mounted thereon the low speed and reverse gear 47 splined to the driven shaft for selective meshing with the countershaft low speed gear 42 or the reverse idler gear 45 for respectively transmitting low speed drive to the driven shaft 25 or the drive thereto in a reverse direction. Freely rotatable on shaft 25 is the second speed gear 48 in constant mesh with the countershaft gear 43 for transmitting a second speed ratio drive. The gear 32 drivingly carries a set of circumferentially spaced external clutch teeth 49. In a similar manner the gear 48 drivingly carries a set of clutch teeth 50.

Splined on the shaft 25 adjacent the forward extremity thereof, is an axially shiftable collar or sleeve 51. Blocker teeth rings 52 and 53 are carried by sleeve 51 and are provided with friction means (not shown) adapted to selectively cooperate with friction means provided with teeth 49 and 50. The blocker teeth rings 52 and 53 are adapted for slight rotation relative to sleeve 51 to facilitate synchronizing of gear speeds prior to clutching of shaft 25 through collar 51 with either gears 32 or 48 in a manner well known in the art.

The transmission is illustrated in its neutral position. To establish the direct or high speed driving connection between shafts 23 and 25, the collar 51 may be shifted axially to the left as viewed in Fig. 2 by the control means hereinafter described to engage the teeth 49 drivingly connected to the gear 32 carried by the driving shaft 23. The collar is drivingly carried by the shaft 25. The second speed driving connection is established by similarly moving the collar 51 to the right as viewed in Fig. 2 to engage teeth 50 carried by gear 48. The first or low speed is obtained by moving gear 47 which is splined to driven shaft 25 forwardly in Fig. 2 into engagement with the countershaft low speed gear 42. The drive then occurs from shaft 23 through main drive pinion 32, countershaft gear 40, countershaft low speed gear 42, gear 47, and driven shaft 25. Reverse drive is obtained by engaging gear 47 with reverse idler gear 45. The transmission mechanism thus described is an embodiment conventionally employed in motor vehicles.

Manual means are provided in the apparatus illustrated in Fig. 7 for the operation of the clutch and control of the transmission speed ratio drive. The clutch pedal 33 is rotatably mounted at 70 on a shaft, not shown. An extension 33' of clutch pedal 33 depends below rotatable mounting 70 and has fixed thereto a pin 71. A torque shaft 72 has one end thereof rotatably mounted on the vehicle frame, and the other end rotatably mounted adjacent the engine block, not shown, in a manner well known in the art. A lever 77 keyed to shaft 72 is provided with depending arm 78. A rod 79 operatively connects arm 78 with pin 71. A slot 80 provided in rod 79 permits relative movement in one direction between rod 79 and pin 71. The upper end of lever 77 is connected by rod 10 with the usual overcenter clutch spring 11. A lever 73 is keyed to torque shaft 72. A rod 75 connects lever 73 with the projecting portion 76 of clutch throwout fork 34. Clutch throwout fork 34 engages collar 35. It will thus been seen that depression of clutch pedal 33 rotates extension 33' about rotatable mounting 70 and through pin 71 retracts rod 79 and rotates arm 78, shaft 72 and lever 73, to push rod 75 and rotate clutch throwout fork 76 thereby moving collar 35 and disengaging the clutch 22.

A manual shift control rod 82 is shown in Fig. 7 as associated with the steering column housing 83. The manual shift control rod 82 is slidably mounted in brackets, not shown, and adapted for both axial and rotary movement. As is usual in the art, the axial movement is adapted to select the transmission shift rail which is to be moved and rotation of the shift control rod 82 slides the shift rail in one of two directions (depending upon the direction of rod rotation) as will be described herein. This effects the desired transmission speed ratio drive connection. A pair of spaced circumferential collars 85 and 86 located adjacent the base of rod 82 receive therebetween the end of a lever 87 which is rotatably mounted on the steering column housing 83. A rod 88 connects lever 87 with a transmission selector lever 57. Axial movement of rod 82 is transmitted through this linkage to the selector lever 57. The function of the selector lever 57 will be described herein.

An arm 91 is keyed to rod 82. A depending rod 92 connects arm 91 with a rotatable lever 93 mounted at 94. An arm 95 of lever 93 is connected to transmission shift lever 69 through rod 96. Rotation of rod 82 through the linkage just described rotates shift lever 69 for manual transmission control. The relation of shift lever 69 to the transmission will be described herein.

Automatic means for controlling both the clutch and the transmission have been associated with the manual means described above. Referring to Fig. 7 an airtight housing 106 containing a cylinder 107 has tubular connections 108 and 108' with the engine intake manifold. A solenoid valve 109 is adapted to selectively open and close this connection and vent cylinder 107. A piston 110 is slidably mounted in cylinder 107 and a spring 111 acting on piston 110 and reacting on housing 106 urges piston 110 to one end of cylinder 107. Manifold low pressure or vacuum as it is commonly referred to, overcomes spring 111 when valve 109 is open. Piston rod 112 connects the piston 110 with an arm 113 carried by a collar 114 rotatably mounted on torque shaft 72. The lever 77 previously referred to is provided with a pin 115 which is adapted to be engaged by the arm 113 when the latter is rotated in a counterclockwise direction. When cylinder 107 is connected with the manifold through valve 109 and tubular passage 108, piston 110 is moved to the left in Fig. 7 and piston rod 112 rotates arm 113 in a counterclockwise direction. Arm 113 engages and carries therewith the pin 115 associated with lever 77 thereby rotating the lever. The lever 77 is keyed to the torque shaft 72 and the torque shaft 72 is thus rotated. Rotation of the shaft 72 rotates the lever 73 keyed thereto which pushes rod 75, rotates clutch throwout fork 76, and disengages the clutch 22. The rotation of the lever 77 and depending arm 78 in this counterclockwise direction does not cause a depression of the clutch pedal 33 because of the cooperation of the slot 80 in rod 79 and the pin 71. This pin and slot combination permits movement of rod 79 to the right in Fig. 7 without an accompanying depression of clutch pedal 33. When valve 109 disconnects cylinder 107 from the manifold and vents the cylinder, spring 111 returns the parts described to their original position permitting the clutch to reengage.

The movement of piston 110 also affects changes in transmission speed ratio drive by the movement of transmission collar 51 illustrated in Fig. 2. The automatic apparatus herein effects changes of speed ratio drive between a relatively slow drive of the driven wheels and a relatively fast drive or between second and direct drive as particularly described in relation to the Fig. 2 transmission. The torque shaft 72 is provided with the collar 114 which is rotatably mounted thereon. An arm 117 is carried by collar 114.

The arm 117 is designed to actuate a motion translating device to be referred to herein as an alternator which is illustrated in Figs. 4 and 6 and generally designated by the numeral 118. The location of alternator 118 and its operative connections with transmission components comprise important features of this invention.

A lever 100 is keyed to a shaft 101 which penetrates the housing of transmission 24 and a pair of rods 102 and 103 are operably connected by a resilient lost motion connection 128 and respectively connected to lever 100 and arm 117. A conventional dashpot 127 similar to that illustrated in Fig. 9 of the copending application Serial No. 694,084, of Carl A. Neracher, now Patent No. 2,528,772, dated February 7, 1950, may also be provided. The resilient connection 128 and dashpot 127 cooperate to cushion the alternator and transmission apparatus from sudden movement of the piston 110. The lever 100 and shaft 101 are thus rotated about in response to movement of the piston 110 in the vacuum cylinder.

The transmission 24 is provided with a casing 130 having a cover plate 132 attached to the side thereof. A pair of shift rails 134 and 136 are disposed within the casing 130 in parallel relationship and in a vertical plane. The shift rail 134 carries a fork 138 adapted to cooperate with the gear 47 to effect an axial shifting thereof in response to axial movement of the shift rail 134. The shift rail 136 carries a fork 140 which is operatively associated with the collar 51 and adapted to axially shift the collar in response to axial movement of the shift rail 136. Each shift rail is provided with a control member 142. Each control member is provided with a slot 144. A lever 146 has each end thereof positioned in one of the slots 144. The control members 142 are each also provided with a second slot 148. A shaft 150 is rotatably mounted in the cover plate 132. The lever 57 previously referred to is keyed on the shaft 150 on the exterior of the transmission. A lever 152 is keyed to the shaft 150 on the inner side of the cover plate 132. The lever 152 carries a detent 154. Rotation of the shaft 150 is adapted to position the detent 154 in a slot 148. The direction of rotation of the shaft 150 determines whether the slot 148 associated with shift rail 134 or the slot 148 associated with the shift rail 136 is engaged by the detent 154. A spring 156 which has one end secured to the transmission housing and the other end operatively secured to the lever 57 urges the finger 152 to its upper position in Fig. 4 thus locking the shift rail 134 against axial movement. Lever 69 previously referred to is keyed to a shaft 160 which penetrates the cover plate 132 on the transmission. A lever 162 is keyed to the shaft 160 on the inner side of the cover plate 132 at substantially the mid portion of the lever 162. The upper portion of the lever 162 is rotatably connected at 164 to the lever 146. Rotation of shaft 160 will rotate lever 162 and lever 146. The direction of rotation of the lever 146 is dependent upon the position of the lever 152. If the upper shift rail 134 is locked in position by the lever 152 a rotation of the lever 146 will move the lower shift rail 136 axially. Manipulation of the shafts 150 and 160 by the linkage connected to the manual shift control rod 82 previously described will thus determine which shift rail is moved and in which direction it is moved. Movement of a shift rail will be transmitted by the fork 140 or 138 to the associated transmission gear to effect a drive of the vehicle.

The lever 100 which is keyed to the shaft 101 has previously been described as adapted for actuation by movement of the piston 110. Apparatus associated with the lever 100 is adapted to move the lower shift rail 136 in response to controlled movement of the piston 110. The alternator 118 which was previously referred to is adapted to translate successive counterclockwise rotations of lever 100 to alternate clockwise and counterclockwise rotations of shaft 160. A pair of fingers 170 and 172 are rotatably mounted on the end portions of the lever 162. A lever 174 is keyed to the shaft 101 on the inner side of the cover plate 132. The fingers 170 and 172 are each provided with a recessed portion 176 adapted to receive a pin 178 which is carried by the end portion of lever 174. Rotation of the lever 174 in a counterclockwise direction from the position corresponding to the dotted line position 178' of the pin 178 in Fig. 4 will cause pin 178 to engage and pull one of the fingers to the right as viewed in Figs. 4 and 6 to thereby rotate lever 162 and shaft 160. The direction of rotation of shaft 160 will be dependent upon whether finger 170 or 172 was moved by pin 178. Rotation of shaft 160 will move shift rail 136 by means of lever 162 and link 146. Spring 156 retains lever 152 in its upper position to lock the upper shift rail 134 throughout automatic control of the transmission. The direction of movement of rail 136 and fork 140 will determine the direction of movement of the collar 51 and thereby determine whether second speed drive or direct drive is obtained in the transmission. Rotation of lever 174 in a clockwise direction in Figs. 4 and 6 in response to return of piston 110 by spring 111 is used to index the lever 174 relative to the fingers 170 and 172. The next succeeding counterclockwise movement of lever 174 in response to the next cycle of piston 110 will pull the other finger and reverse the direction of rotation of shaft 160 thereby effecting a change in the transmission speed ratio drive.

Movement of piston 110 under the influence of vacuum causes the counterclockwise rotation of lever 174 and the spring return of piston 110 causes the clockwise rotation of lever 174. The fact that the pin 178 is retained between the fingers at all times assures that the fingers will not be moved out of operative relation with the pin 178 when manual shifts are made by the operator. A spring 124 urges the fingers together.

When the finger 170 is moving to the left from its Fig. 4 position the upper surface of finger 172 will guide the finger 170 in its movement to the left so that it will be positioned for association with pin 178 on its next counterclockwise movement. When the finger 172 is being moved to the left from its Fig. 6 position by pin 178 the lower surface of finger 170 will guide the movement of finger 172 so that it will be positioned for association with pin 178 on its next counterclockwise movement.

Means to control the actuation of the piston 110 is illustrated in Fig. 7. A grounded source 180 of electric energy is connected through ignition switch 182 to a switch 184 by electrical conductor 186. Switch 184 is adapted to provide a selection between manual or automatic operation of the transmission and may be placed on the dash or other location convenient to manipulation by the driver of the vehicle. Electrical line 188 connects switch 184 with a switch 190 adapted to be closed when the throttle is substantially closed. Line 192 connects switch 190 with a two-way shift rail switch 194 having a finger thereon (not shown) adapted to be engaged by abutments on the transmission shift rail 136. Reference may be had to the copending application of Carl a Neracher, Serial No. 694,084, now Patent No. 2,528,772 dated November 7, 1950, for a more complete description thereof. A first circuit in switch 194 is disconnected and a second circuit is connected when the shift rail has completed its movement. This switch movement alternates with each transmission speed ratio change of the shift rail 136. A vehicle speed responsive governor 196 has one outlet terminal 198 and two inlet terminals 200 and 202 and is adapted to connect the outlet terminal with one inlet terminal below a predetermined speed and with the other inlet terminal above the predetermined speed.. Each inlet terminal is connected to one of the circuits referred to for switch 194. Line 204 connects governor terminal 198 with solenoid valve 109 in manifold line 108. Line 206 grounds the circuit. Valve 109 is adapted to connect cylinder 107 with the manifold line 108 when energized and to close line 108 and vent cylinder 107 to atmosphere when not energized.

In the operation of the apparatus thus far described when the driver closes switch 184 to select automatic drive and then closes the switch 190 by manipulation of the usual accelerator pedal 208 to a throttle closed position above a predetermined vehicle speed, valve 109 is energized to admit vacuum to cylinder 107. Piston 110 is moved to the left in Fig. 7 and clutch 22 is disengaged through the linkage 112, 113, 115, lever 78, shaft 72, arm 73, rod 75, and clutch throwout fork 76. This motion of the piston also causes a delayed movement of link 146 and shift rail 136 through arm 113, collar 114, arm 117, rod 102, spring 128, arm 100, shaft 101 and the alternator mechanism 118. The change in speed ratio drive caused by moving link 146 moves the shift rail 136 which breaks the circuit at switch 194 thereby deenergizing solenoid valve 109 and permitting spring 111 to move piston 110 to the right in Fig. 7 permitting the clutch to reengage. The switch 194 is now connected with its other circuit and a complete electrical circuit will be made when the governor 196 connects the outlet terminal 198 with the other inlet terminal below a predetermined vehicle speed and the driver closes the throttle switch 190 by releasing accelerator pedal 208. The electrical circuit then being complete the solenoid valve 109 is energized and the piston 110 again moved to the left in Fig. 7 to repeat the process. The alternator mechanism will this time move the transmission link 146 in the reverse direction from that previously experienced. The shift rail 136 will be moved and the collar 51 moved to cause a second speed drive in the Fig. 2 transmission.

In order that the driver cannot open switch 190 before the shift has been completed a resilient connection may be incorporated in the throttle linkage. Reference may be had to the copending application, Serial No. 687,248 of Otto W. Schotz for a description thereof. This device has been generally designated by the numeral 210 in Fig. 7 of the drawings.

I claim:

1. In a change speed power transmission for a motor vehicle, a pair of parallel shift rails adapted for selective shifting in different directions to establish different speed ratio drives, a lever mounted for movement in a plane parallel to the plane defined by said rails, said lever having each of its end portions operatively connected to one of said rails, a pivotally mounted selector lever adapted for swinging about its pivot into locking engagement selectively with said rails thereby to determine the rail to be moved when said lever is moved, a movable member, a first means to move said member through a predetermined cycle including movement in a first direction and return in response to selected vehicle operating conditions, a second means to cause successive cycles of movement of said member to alternately move said lever in said first direction and in said second direction, said second means comprising a first rotatable shaft, a pair of oppositely directed lever arms keyed to said first shaft, an operative connection between one of said lever arms and said lever, a first finger element rotatably mounted on one of said lever arms and having an engageable portion, a second finger element rotatably mounted on the other of said lever arms and having an engageable portion, a second rotatable shaft operatively connected to said member for rotation thereby in a first direction and in a second direction in response to movement of said member, an arm keyed to said second shaft and adapted to rotate therewith, an engaging element on said arm, said arm being adapted to move said engaging element toward said first shaft when said arm rotates in said first direction and to move said engaging element away from said first shaft when said arm rotates in said second direction, said engaging element being adapted to selectively engage said engageable portions of said fingers and to transmit motion through said fingers to rotate said first shaft, said operative connection being adapted to convert rotation of said first shaft to movement of said lever and one of said rails.

2. In a change speed power transmission for a motor vehicle, a pair of parallel shift rails adapted for selective shifting in different directions to establish different speed ratio drives, a first lever mounted for movement in a plane parallel to the plane defined by said rails, said first lever having each of its end portions operatively connected to one of said rails, a pivotally mounted selector lever adapted for swinging about its pivot into locking engagement selectively with said rails thereby to determine the rail to be moved when said first lever is moved, a rotatable lever carried within said housing in a plane substantially parallel to said first plane, said first lever being operatively connected to said rotatable lever for movement thereby, an input member, means to reciprocate said input member through a cycle including movement in a first direction and return in response to predetermined vehicle operating conditions and means to convert successive cycles of movement of said input member to alternate movements of said rotatable lever in a first direction and in a second direction to thereby move said first lever and one of said shift rails alternately in one direction and another direction in response to successive cycles of said input member.

3. In a change speed power transmission for a motor vehicle, a pair of parallel shift rails adapted for selective shifting in different directions to establish different speed ratio drives, a first lever mounted for movement and having each of its end portions operatively connected to one of said rails, a selector lever mounted for movement into locking engagement selectively with said rails thereby to determine the rail to be moved when said first lever is moved, an input member, means to reciprocate said input member through a cycle including movement in a first direction and return in response to predetermined vehicle operating conditions and means to convert successive cycles of movement of said input member to alternate movements of said first lever and one of said shift rails in a first direction and a second direction.

4. In a change speed power transmission for a motor vehicle, a pair of parallel shift rails adapted for selective shifting in different directions to establish different speed ratio drives, a first lever mounted for movement and having each of its end portions operatively connected to one of said rails, a selector lever mounted for movement into locking engagement selectively with said rails thereby to determine the rail to be moved when said first lever is moved, a rotatable lever carried within said housing and operatively connected to said first lever so that said first lever is moved in response to movement of said rotatable lever, an input member, means to reciprocate said input member through a cycle including movement in a first direction and return in response to predetermined vehicle operating conditions and means to convert successive cycles of movement of said input member to alternate movements of said rotatable lever in a first direction and in a second direction to thereby move said first lever and one of said shift rails alternately in one direction and another direction in response to successive cycles of said input member.

WILLIAM T. DUNN.

REFERENCES CITED

The following references are of record in the file of this patent:

UNITED STATES PATENTS

| Number | Name | Date |
| --- | --- | --- |
| 1,773,216 | Campbell | Aug. 19, 1930 |
| 1,780,460 | Burtnett | Nov. 4, 1930 |
| 1,830,395 | Hanson | Nov. 3, 1931 |
| 1,864,103 | Tenbrook | June 21, 1932 |
| 2,169,822 | Taylor | Aug. 15, 1939 |
| 2,187,824 | Britton | Jan. 23, 1940 |
| 2,208,384 | Morrison | July 16, 1940 |
| 2,208,828 | Adams | July 23, 1940 |
| 2,222,913 | Pescara | Nov. 26, 1940 |
| 2,223,406 | Chisholm | Dec. 3, 1940 |
| 2,227,830 | Phillips | Mar. 31, 1942 |
| 2,327,063 | Randol | Aug. 17, 1943 |
| 2,351,067 | Randol | June 13, 1944 |
| 2,388,043 | Derungs | Oct. 30, 1945 |